(12) United States Patent
Ji et al.

(10) Patent No.: US 11,533,264 B2
(45) Date of Patent: Dec. 20, 2022

(54) DEVICE AND METHOD FOR ADAPTIVE LINK ADAPTATION

(71) Applicant: APPLE INC., Cupertino, CA (US)

(72) Inventors: Zhu Ji, San Jose, CA (US); Johnson O. Sebeni, Fremont, CA (US); Xugang Song, Beijing (CN); Yanxia Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 598 days.

(21) Appl. No.: 15/757,812

(22) PCT Filed: Sep. 7, 2015

(86) PCT No.: PCT/CN2015/089041
§ 371 (c)(1),
(2) Date: Mar. 6, 2018

(87) PCT Pub. No.: WO2017/041207
PCT Pub. Date: Mar. 16, 2017

(65) Prior Publication Data
US 2019/0036829 A1 Jan. 31, 2019

(51) Int. Cl.
*H04B 17/336* (2015.01)
*H04B 7/01* (2006.01)
*H04L 1/00* (2006.01)
*H04L 12/851* (2013.01)
*H04W 24/08* (2009.01)
*H04W 76/28* (2018.01)
*H04L 47/2483* (2022.01)
*H04W 24/00* (2009.01)
(Continued)

(52) U.S. Cl.
CPC ........... *H04L 47/2483* (2013.01); *H04B 7/01* (2013.01); *H04B 17/336* (2015.01); *H04L 1/0003* (2013.01); *H04L 1/0026* (2013.01); *H04W 24/00* (2013.01); *H04W 24/08* (2013.01); *H04W 28/0242* (2013.01); *H04W 76/28* (2018.02); *H04L 47/24* (2013.01)

(58) Field of Classification Search
CPC ....... H04B 17/336; H04B 7/01; H04L 1/0003; H04L 1/0026; H04L 47/2483; H04L 47/24; H04W 24/00; H04W 24/08; H04W 28/0242; H04W 76/28
USPC .................................................. 370/329, 524
See application file for complete search history.

(56) References Cited

U.S. PATENT DOCUMENTS

2004/0116142 A1* 6/2004 Wang ................... H03M 13/091
455/522
2014/0344881 A1* 11/2014 Bartholomay .......... H04L 47/14
725/116

(Continued)

*Primary Examiner* — Pankaj Kumar
*Assistant Examiner* — Natali Pascual Peguero
(74) *Attorney, Agent, or Firm* — Fay Kaplun & Marcin, LLP

(57) ABSTRACT

A device, system, and method perform an adaptive link adaptation. The method, at a user equipment (UE) connected to a Long Term Evolution (LTE) network via an evolved Node B (eNB), includes determining a type of wireless traffic being utilized by the UE based upon at least one application executed on the UE, the wireless traffic being one of a data only, a voice only, or a combination thereof. The method includes determining a block error rate (BLER) target value to be used in a channel state feedback operation associated with a link adaptation operation for a connection between the UE and the eNB.

21 Claims, 6 Drawing Sheets

(51) Int. Cl.
  *H04W 28/02* (2009.01)
  *H04L 47/24* (2022.01)

(56) References Cited

U.S. PATENT DOCUMENTS

2015/0117196 A1* 4/2015 Wang .................... H04L 1/0018
  370/232
2015/0373732 A1* 12/2015 Davydov .................. H04L 5/00
  370/329
2018/0176828 A1* 6/2018 Chen ..................... H04W 24/02

* cited by examiner

DEVICE AND METHOD FOR ADAPTIVE LINK ADAPTATION

BACKGROUND INFORMATION

A mobile user equipment (UE) may be configured to communicate wirelessly through a wireless communications network. There are various different wireless communication networks that provide services such as packet data exchange, voice communications, video communications, circuit-switched information exchange, broadcast services, messaging services, etc. The wireless communication networks may utilize different access methods such as a Code Division Multiple Access (CDMA) system, a Time Division Multiple Access (TDMA) system, a Frequency Division Multiple Access (FDMA) system, an Orthogonal Frequency Division Multiple Access (OFDMA) system, etc.

The UE may establish a wireless connection to the wireless communications network through a base station (BS) which may be an access point. Thus, the BS may provide an authentication functionality when the UE associates with the BS. Once associated, data that is exchanged between the UE and the network may be performed through the BS. To better support this functionality, the BS may provide a control mechanism for the connection such that the data that is being exchanged is properly transmitted to the UE and received from the UE. For example, a channel estimation may provide properties of a communication link or the established connection between the UE and the BS. The channel estimation may more specifically identify a manner in which signals propagate between the UE and the BS that may indicate effects such as scattering, fading, power decay with distance, etc. This information may enable the BS to control the transmissions such as identifying a power level for transmissions. Accordingly, the control mechanism may enable a more reliable connection for the UE.

SUMMARY

A first exemplary embodiment is directed to a method comprising: at a user equipment (UE) connected to a Long Term Evolution (LTE) network via an evolved Node B (eNB): determining a type of wireless traffic being utilized by the UE based upon at least one application executed on the UE, the wireless traffic being one of a data only, a voice only, or a combination thereof; and determining a block error rate (BLER) target value to be used in a channel state feedback operation associated with a link adaptation operation for a connection between the UE and the eNB.

Another exemplary embodiment is directed to a user equipment, comprising: a transceiver establishing a connection with an evolved Node B (eNB) of a Long Term Evolution (LTE) network; and a processor determining a type of wireless traffic being utilized by the UE based upon at least one application executed on the UE, the wireless traffic being one of a data only, a voice only, or a combination thereof, the processor determining a block error rate (BLER) target value to be used in a channel state feedback operation associated with a link adaptation operation for a connection between the UE and the eNB.

A further exemplary embodiment is directed to a method comprising: at a user equipment (UE) connected to a Long Term Evolution (LTE) network via an evolved Node B (eNB): determining at least one of a type of wireless traffic being utilized by the UE and a link scenario present at the UE based upon at least one application executed on the UE and connection-related information; and setting a parameter based upon the at least one of the type of wireless traffic and the link scenario; determining channel state information based upon the parameter; and generating a channel state feedback report to be transmitted to the eNB, the channel state feedback report including the channel state information..

DETAILED DESCRIPTION

Figure 1:
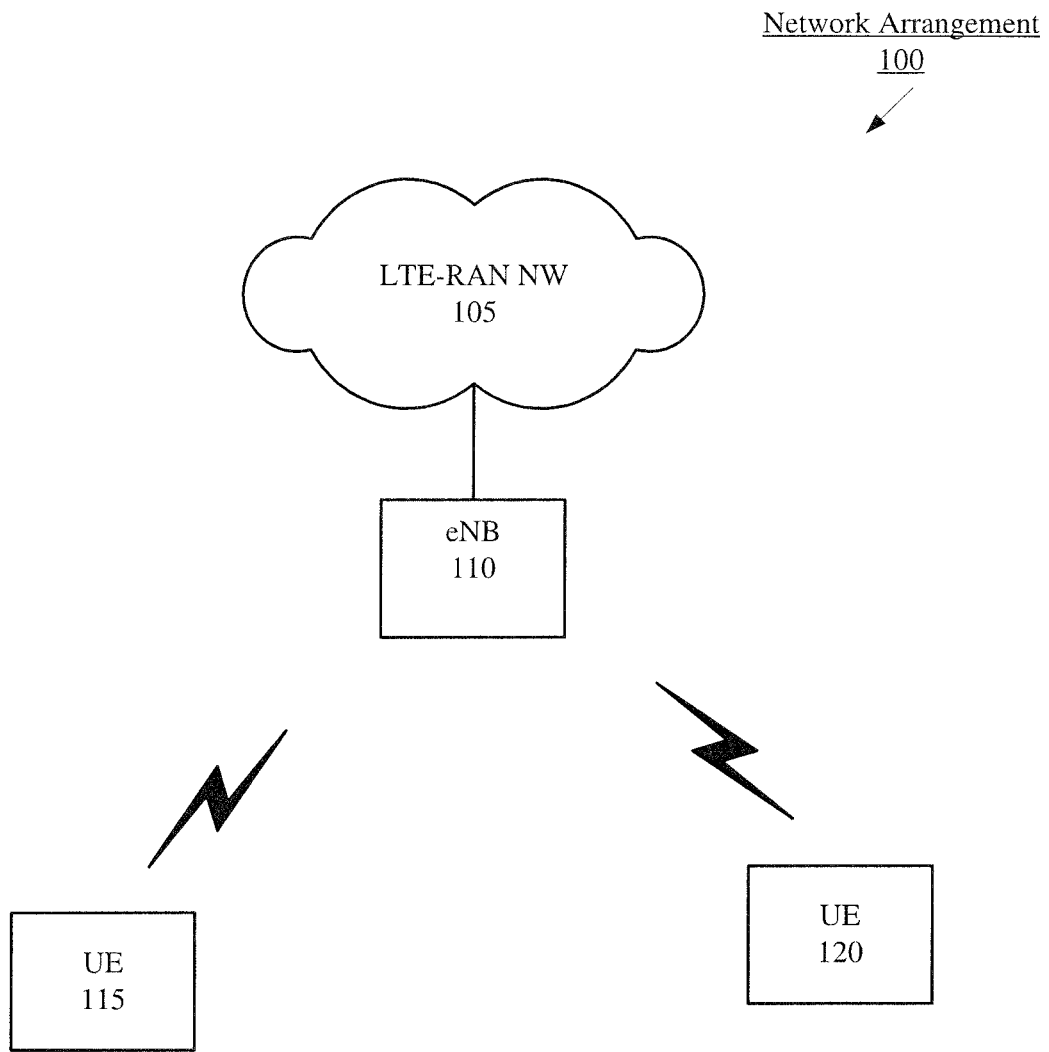
FIG. 1 shows an exemplary network arrangement according to the exemplary embodiments.

The exemplary embodiments may be further understood with reference to the following description and the related appended drawings, wherein like elements are provided with the same reference numerals. The exemplary embodiments are related to a device and method for an adaptive link adaptation to manage a connection between a user equipment (UE) and a wireless network. Specifically, the exemplary embodiments provide a mechanism that utilizes a channel state feedback operation of an inner loop in a link adaptation operation for Long Term Evolution (LTE) networks. The adaptive nature of the link adaptation operation according to the exemplary embodiments provides a dynamic functionality in managing the connection, particularly through utilizing a dynamic block error rate (BLER) target value.

Initially, it is noted that the exemplary embodiments are described with regard to a LTE network. The exemplary embodiments may be used for various types of LTE networks such as a time division (TD) LTE network, a frequency division (FD) LTE network, a combination thereof, etc. However, the use of the LTE network is only exemplary. The exemplary embodiments may be extended to apply to other wireless networks and systems. Specifically, the exemplary embodiments may be used in wireless networks where physical data channels experience different code rates or channel estimation accuracy. Accordingly, the LTE network may represent any type of wireless network including cellular and non-cellular networks.

FIG. 1 shows an exemplary network arrangement 100 according to the exemplary embodiments. The exemplary network arrangement 100 is illustrated as including UEs 115, 120. In this example, it is assumed that a respective, different user is using each of the UEs 115, 120. For example, a first user may be utilizing the UE 115 while a second user may be utilizing the UE 120. Those skilled in the art will understand that the UEs 115, 120 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of two UEs 115, 120 is only provided for illustrative purposes.

Each of the UEs 115, 120 may be configured to communicate with one or more networks. According to the exemplary embodiments, the UEs 115, 120 may communicate with a LTE radio access network (LTE-RAN) 105. Specifically, the UEs 115, 120 may connect to the LTE-RAN 105 via an base station (which may be an access point) such as an evolved Node B (eNB) 110. The LTE-RAN 105 may be a cellular network that may be deployed by a cellular provider (e.g., Verizon, AT&T, Sprint, T-Mobile, etc.). The LTE-RAN 105 may include, for example, base stations such as the eNB 110 (or other types such as Node Bs, HeNBs, etc.) that are configured to send and receive traffic from UEs that are equipped with the appropriate LTE cellular chip set. Those skilled in the art will understand that the cellular providers may also deploy other types of networks, including further evolutions of the cellular standards, within their cellular networks.

More specifically, the eNB 110 may include one or more antenna groups which are configured to exchange data with the UEs 115, 120. The data may be exchanged in communications therebetween where data transmitted from the eNB 110 to the UEs 115, 120 comprise a downlink or forward link and data transmitted from the UEs 115, 120 to the eNB 110 comprise an uplink or reverse link. Based upon the type of LTE-RAN 105, the communication links under a frequency division duplex (FDD) system may use different frequencies for communications, particularly between the UE 115 and the UE 120 while communication links under a time division duplex (TDD) system may use a common frequency but at differing times. It should be noted that the communication between the UEs 115, 120 and the LTE-RAN 105 via the eNB 110 may include further parameters such as an operating area of the eNB 110 and diversity techniques (e.g., spatial multiplexing, spatial diversity, pattern diversity, etc.). The exemplary embodiments may utilize any of these properties of the LTE-RAN 105.

Figure 2:
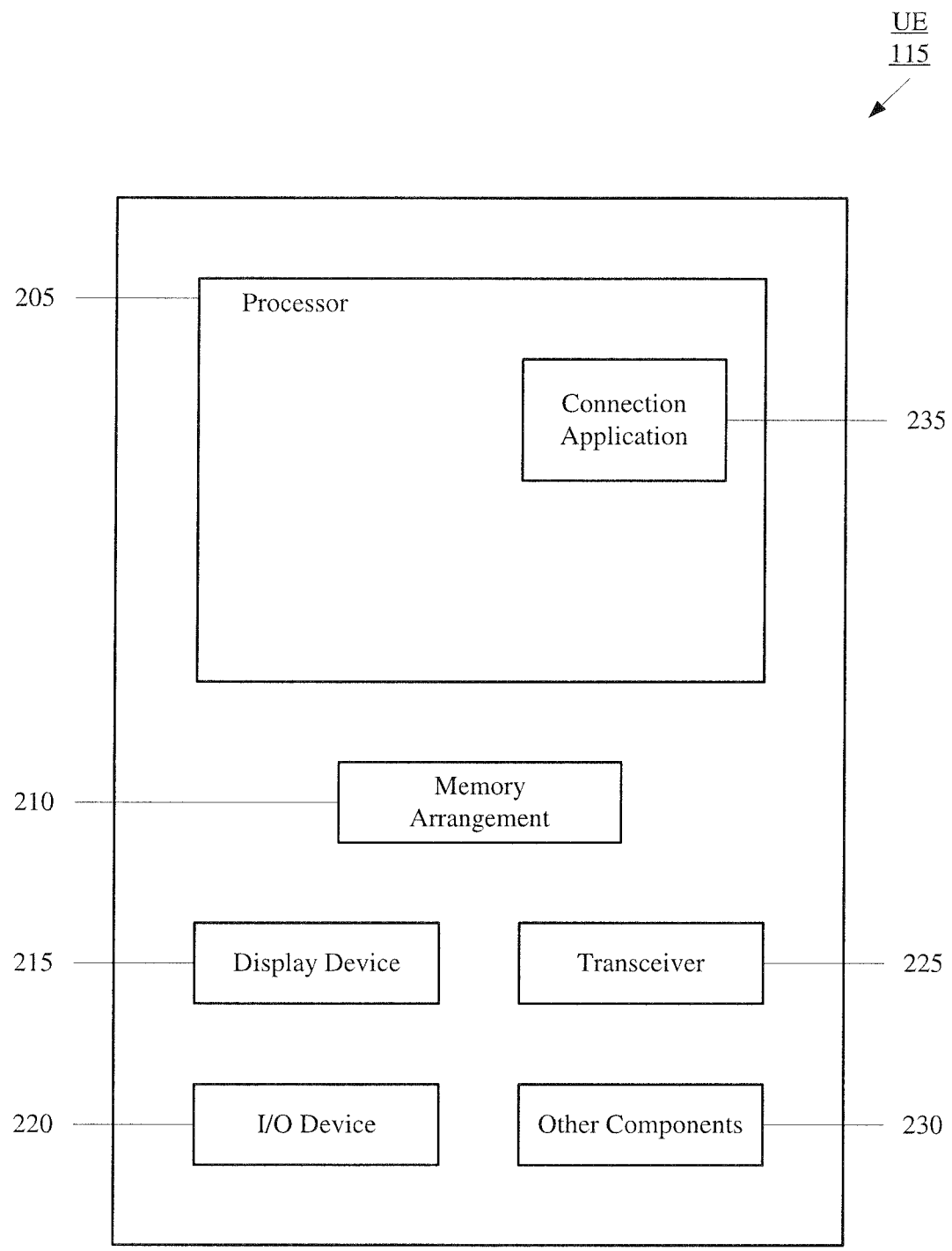
FIG. 2 shows an exemplary user equipment configured to establish a connection with an base station according to the exemplary embodiments.

FIG. 2 shows the UE 115 configured to establish a connection with the eNB 110 of the LTE-RAN 105 according to the exemplary embodiments. Initially, it is noted that the description below relates to the UE 115. However, the description for the UE 115 may also apply to the UE 120. The UE 115 is configured to execute an application that performs the channel state feedback operation according to the exemplary embodiments. Specifically, the application may further determine a BLER target value to be used in performing the channel state feedback operation. The UE 115 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 115 to other electronic devices, etc.

The processor 205 may be configured to execute a plurality of applications of the UE 115. For example, the applications may include a web browser when connected to the LTE-RAN 105 via the transceiver 225. In another example, the processor 205 may execute a VoLTE call application that enables the UE 115 to perform a VoLTE call functionality (e.g., when the UE 115 also attaches to an Internet Protocol (IP) Multimedia Subsystem (IMS)). In yet another example and according to the exemplary embodiments, the processor 205 may execute a connection application 235. As will be described in further detail below, the connection application 235 may perform the above noted operation of the channel state feedback in addition to the determination of the BLER target value according to the exemplary embodiments.

It should be noted that the processor 205 may include an application processor and a baseband processor. For example, the application processor may be utilized for a plurality of applications executed on the UE 115 such as the web browser. In another example, the baseband processor may be utilized for operations associated with the LTE-RAN 105 and the connection thereto.

It should also be noted that the above noted applications each being an application (e.g., a program) executed by the processor 205 is only exemplary. The functionality associated with the applications may also be represented as a separate incorporated component of the UE 115 or may be a modular component coupled to the UE 115, e.g., an integrated circuit with or without firmware.

The memory 210 may be a hardware component configured to store data related to operations performed by the UE 115. Specifically, the memory 210 may store data related to the connection application 235. For example, in determining various connection parameters and metrics, this information may be stored during the generating of a report corresponding to the channel state feedback operation. In another example, the information used in determining the BLER target values as well as the BLER target values themselves and their correspondences for use may be stored in the memory 210. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with the LTE-RAN 105. The transceiver 225 may operate on a variety of different frequencies or channels (e.g., set of consecutive frequencies) that are related to the LTE-RAN 105. Thus, an antenna (not shown) coupled with the transceiver 225 may enable the transceiver 225 to operate on the LTE frequency band. For example, the UE 115 may perform uplink and/or downlink communication functionalities via the transceiver 225 with the LTE-RAN 105.

Figure 3:
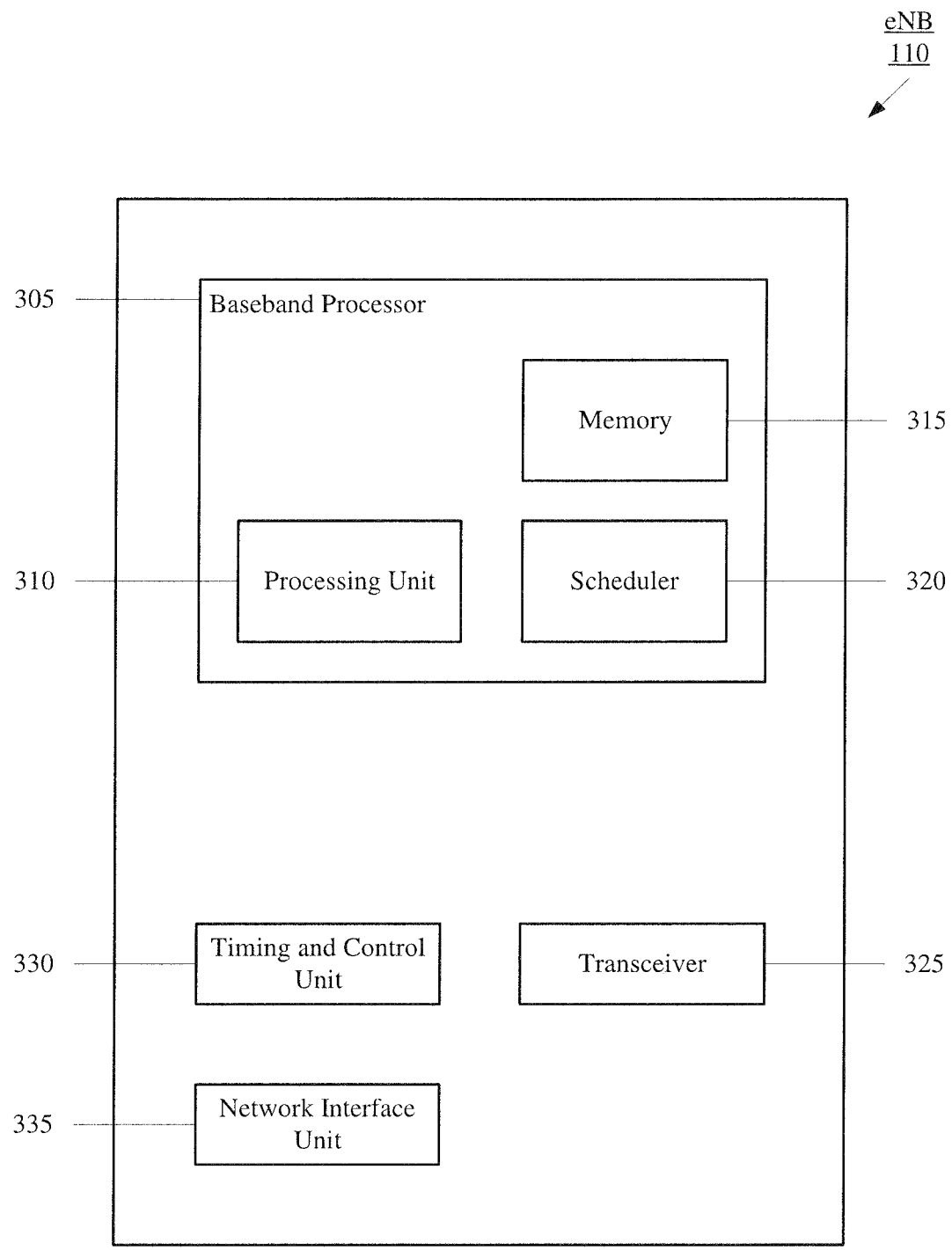
FIG. 3 shows an exemplary base station configured to establish a connection with a user equipment according to the exemplary embodiments.

FIG. 3 shows the eNB 110 of the LTE-RAN 105 configured to establish a connection with the UEs 115, 120 according to the exemplary embodiments. As discussed above, the eNB 110 may be any access point or base station of the LTE-RAN 105 that enables the UEs 115, 120 to establish a connection to the LTE-RAN 105. The eNB 110 may be one of a plurality of base stations deployed for the LTE-RAN 105. The eNB 110 may provide a portion of the operating area of the LTE-RAN 105. The eNB 110 may include a baseband processor 305, a transceiver 325, a timing and control unit 330, and a network interface unit 335.

The baseband processor 305 may provide a radio communication with the UEs 115, 120 via the transceiver 325 (which may be coupled to an antenna (not shown)). The transceiver 325 may be substantially similar to the transceiver 225 of the UE 115 such as operating on a predetermined frequency or channel of the LTE-RAN 105. It should be noted that the transceiver 225 may include a separate transmitter and receiver or a combined unit that performs the functionalities of the transmitter and receiver. The baseband processor 305 may be configured to operate according to a wireless communications standard based upon the LTE-RAN 105 (e.g. a 3GPP LTE). The baseband processor 305 may include a processing unit 310 to process relevant information for the eNB 110. The baseband processor 305 may also provide additional baseband signal processing operations as may be utilized such as a UE registration, a channel signal information transmission, a radio resource management, a connected discontinuous reception (C-DRX) functionality, etc. The baseband processor 305 may also include a memory arrangement 310 that is in communication with the processing unit 310 to store the relevant information including the various signal processing operations for the eNB 110. The baseband processor 305 may further include a scheduler 320 which may provide scheduling decisions for the UEs 115, 120 serviced by the eNB 110.

The timing and control unit 330 may monitor operations of the baseband processor 305. The timing and control unit 330 may also monitor the operations of the network interface unit 335. The timing and control unit 330 may accordingly provide appropriate timing and control signals to these units. The network interface unit 335 may provide a bi-directional interface for the eNB 110 to communicate with other network components of the LTE-RAN 105 such as a core network or a back-end network. This may enable a facilitation of administrative and call-management functionalities for the UEs 115, 120 operating in the LTE-RAN 105 through the eNB 110.

The exemplary embodiments provide a mechanism for performing a channel state feedback operation. The channel state feedback operation may be used in generating a report for the eNB 110 to manage the connection between the UE 115 and the eNB 110. The channel state feedback operation may be associated with a link adaptation operation, particularly an inner loop thereof. Specifically, the mechanism of the exemplary embodiments set a BLER target value to be used in the channel state feedback operation.

The link adaptation functionality may be a wireless communication that denotes a matching of modulation, coding, and other signal and protocol parameters to a radio link such as the connection between the UE 115 and the eNB 110. For example, the denoting may be to a path loss, an interference such as from signals from other UEs, a sensitivity of a receiver, an available transmitter power margin, etc. The link adaptation functionality may also be referred to as an adaptive modulation and coding (AMC) functionality. Those skilled in the art will understand that the link adaptation functionality may be used with a rate adaptation functionality in adapting a modulation and coding scheme (MCS). This adaptation may be with respect to a quality of the radio channel in which the connection is established between the UE 115 and the eNB 110. Therefore, the bit rate and robustness of a data transmission may be managed where the process of the link adaptation functionality is dynamic to change the signal and protocol parameters as the radio link conditions change.

Those skilled in the art will also understand that an adaptive modulation system requires channel state information at the transmitter of the UE 115. Accordingly, known mechanisms may be used in determining the connection parameters and metrics that are utilized for this purpose. That is, connection-related information may include the connection parameters and metrics that are determined or calculated such as a channel estimation, a received signal strength, etc. Those skilled in the art will understand that the connection-related information may be determined based upon packets or signals received from the eNB 110 such as pilot signals. For example, in a TDD system, the channel from the transmitter to the receiver may be assumed to be approximately the same as the channel from the receiver to the transmitter. In another example, the information of the channel may be directly measured at the receiver and used with the transmitter. Through this mechanism of the adaptive modulation system, a rate of transmission and/or bit error rates may be improved through exploiting the channel state information that is determined at the transmitter of the UE 115.

Figure 4:
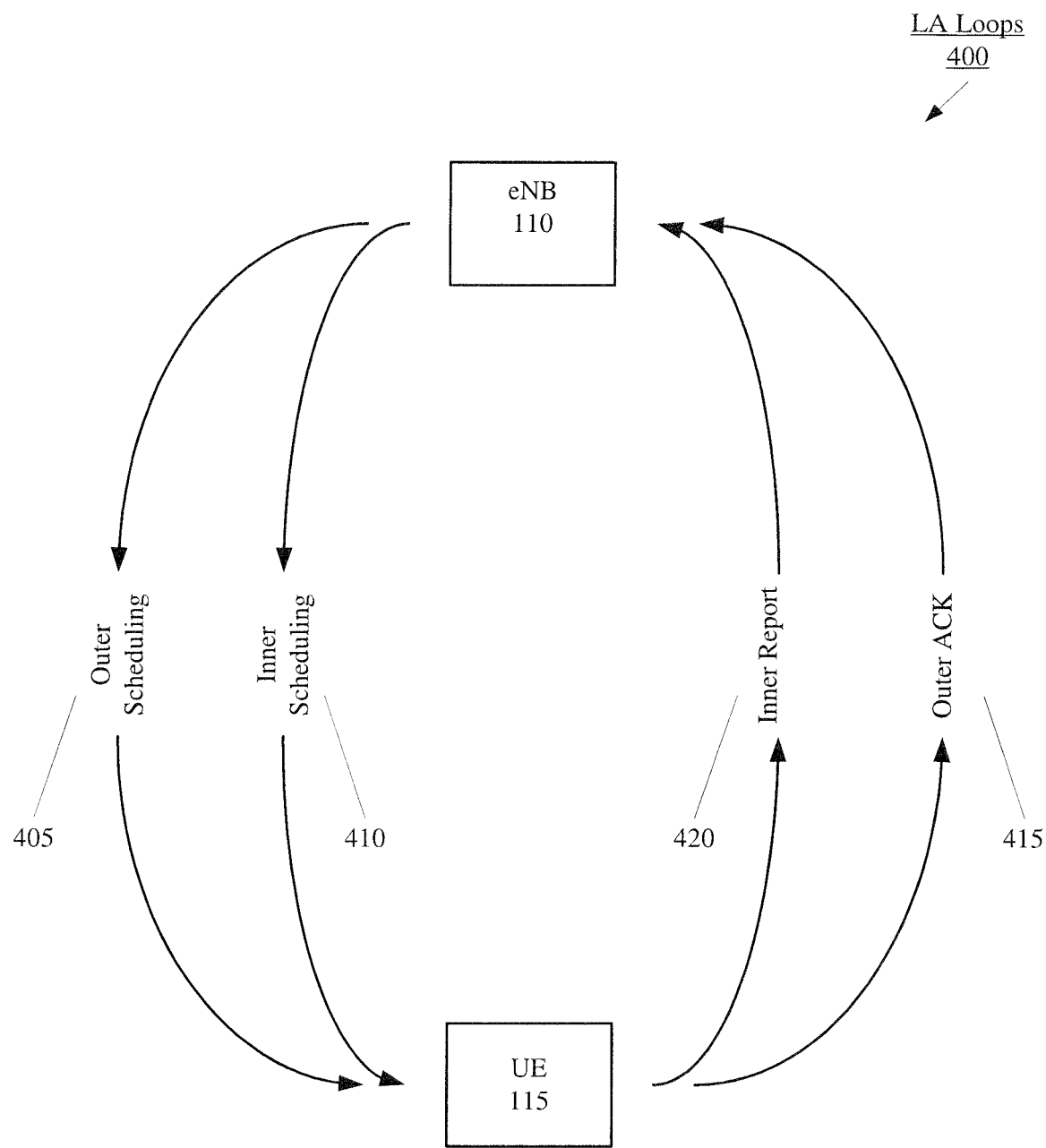
FIG. 4 shows exemplary link adaptation loops according to the exemplary embodiments.

FIG. 4 shows exemplary link adaptation loops 400 according to the exemplary embodiments. The link adaptation loops 400 may be the representative components of the link adaptation functionality between the eNB 110 and the UE 115. As illustrated, the link adaptation functionality may include an outer loop and an inner loop. Specifically, the outer loop may include a first portion of an outer scheduling 405 that involves an operation from the eNB 110 to the UE 115. The outer loop may also include a second return portion of an outer acknowledgement (ACK) 415 that involves an operation from the UE 115 to the eNB 110. The inner loop may include a first portion of an inner scheduling 410 that involves an operation from the eNB 110 to the UE 115. The inner loop may also include a second return portion of an inner report 420 that involves an operation from the UE 115 to the eNB 110.

The outer loop may include a BLER target to be maintained by the eNB 110. The BLER target may vary for different channel scenarios such as being Doppler dependent. The channel state feedback operation may have an estimation at the UE 115 that is not always reliable. Therefore, the eNB 110 may filter the BLER of the UE 115 based upon adjustments to the MCS type and/or a multiple-in multiple-out (MIMO) type that is scheduled for the UE 115 by the eNB 110. The BLER filtering of the outer loop may be implemented in different manners. In a first example, the BLER filtering may be an infinite impulse response (IIR) filtering of errors in a cyclic redundancy check (CRC). In a second example, the BLER filtering may be a block-wise moving average. Furthermore, one or more hystereses may usually be applied to the BLER targets when an average BLER changes to a degree sufficiently large enough to trigger the MCS adjustment. The outer scheduling 405 may particularly relate to a scheduling adjustment such as a MCS to resource block (RB). The scheduling adjustment may also be based upon a filtered BLER. For example, in the LTE-RAN 105, the MCS that determines the code rate where a higher MCS results in a higher code rate may be adjusted based on the filtered BLER fluctuation. In addition, a step size of the MCS adjustment may also be of importance. To have a stable outer loop, the step size for the MCS to be adjusted upward is usually smaller compared to the step size for the MCS to be adjusted downward. This processing of the outer scheduling 405 may result in the outer ACK 415 such as the ACK being included in a physical downlink shared channel (PDSCH).

Those skilled in the art will also understand that the outer loop including the outer scheduling 405 and the outer ACK 415 may provide an overriding control of the connection management as the outer loop of the link adaptation operation may be performed substantially by the eNB 110 rather than relying upon processes to be performed by other components. However, due to the nature in which the outer loop of the link adaptation operation is performed, a relatively high amount of time is required for adaptation such as on the order of several seconds.

The inner loop may relate to the channel state feedback functionality. Specifically, the channel state feedback may be for an estimation based upon the channel estimation on downlink pilot signals received from the eNB 110 by the UE 115. Accordingly, the channel state feedback estimation may be performed by the connection application 235 of the UE 115. A report resulting from the channel state feedback operation may be provided back to the eNB 110 via the inner report 420. More specifically, the inner scheduling 410 may also be a scheduling based upon the MCS, a number of RBs, and MIMO types associated with the UE 115. However, the basis of the scheduling may be from the channel state estimation reports that the eNB 110 receives from the UE 115. Thus, the channel state feedback reports from the UE 115 may include connection parameters and metrics such as a channel quality indicator (CQI), a precoding matrix index (PMI), a rank indication (RI), etc. As will be described in further detail below, the inner loop operation of the channel state feedback estimation may have an associated dynamic BLER target value. Specifically, the dynamic BLER target value may be a target to be achieved for the channels being used such as Additive White Gaussian noise (AWGN) channels. Accordingly, the BLER target value may be a basis upon which the channel state feedback operation is performed, particularly in determining the CQI to be included in the channel state feedback report.

Those skilled in the art will also understand that the inner loop including the inner scheduling 410 and the inner report 420 may provide information to the eNB 110 for connection management related to processes to be performed by the UE 115. Due to the nature in which the inner loop of the link adaptation operation is performed, a relatively small amount of time is required for adaptation such as on the order of milliseconds. However, the nature of the inner loop of the link adaptation operation may also be unreliable. Accordingly, the outer loop may be used as the overriding control.

Although the eNB 110 may apply outer loop adaptation, a response of the eNB 110 in the outer loop link adaptation may be slow due to a need to filter the BLER results and smooth out a MCS adjustment over time. Also, in dynamic scenarios, the BLER tracking performed by the eNB 110 may not always be sufficiently fast enough to track the wireless channel scenario changes. Furthermore, not all eNBs may be able to perform the outer loop link adaptation such that the UE 115 has to rely on itself to have a reasonable channel state feedback reporting for maintaining the BLER target. The exemplary embodiments accordingly provide a mechanism where the UE 115 may track the BLER and maintain a dynamically set BLER target value for the inner loop operation in the link adaptation functionality. The channel state feedback adjustment at the UE 115 may also be designed to not conflict with the eNB 110. That is, the results that are generated from the inner loop operation may not conflict with the results that are generated from the outer loop operation. For example, if the MCS feedback by the eNB 110 is different from a UE requested CQI, the eNB 110 may be followed to avoid conflicts. In another example, the UE 115 may select different BLER loop update rates from the outer loop operation of the link adaptation functionality for the eNB 110. In a further example, the channel state feedback estimation adjustment may be performed by updating a mapping table at the UE 115 such as a signal to noise ratio (SNR) to spectral efficiency (SE) mapping or a SE to CQI mapping.

The mechanisms according to the exemplary embodiments therefore dynamically adjust the BLER target value in performing the channel state feedback operation of the inner loop operation of the link adaptation functionality in determining the CQI. The adjustment of the BLER target value may consider various parameters. In a first example, the traffic type in the LTE-RAN 105 may be considered. For example, with packet data transmissions, the LTE-RAN 105 may primarily be designed for high speed data traffic with MIMO- Orthogonal Frequency Division Multiple (OFDM) principles applied at the physical layers. A requirement of the BLER target for data may usually be relaxed. In another example, voice traffic in the LTE-RAN 105 may be supported through VoLTE with an IMS stack and proper C-DRX configurations at the physical layer akin to voice traffic patterns (e.g., 20 ms or 40 ms C-DRX cycles). Since voice is a realtime bi-directional communication, a more stringent BLER target requirement for link adaptation may be utilized. In a second example, the link scenarios may be considered. For example, for data traffic, scenarios with a high Doppler and/or low SNR may utilize a first BLER target while scenarios with low Doppler and/or middle/high SNR may utilize a second, different BLER target since a common BLER target may not be ideal due to unreliability of the wireless channels. Enforcing a BLER target that does not properly consider the state of the wireless channels may result in limiting the UE 115 to a smaller MCS that leads to a lower effective throughput. In another example, voice traffic may experience the same scenarios as described above for data traffic. However, because the objective for voice traffic is audio quality, the BLER target may be different. Thus, the mechanism of the exemplary embodiments adapt the BLER target to different scenarios of the wireless channel including Doppler, SNR, mobility, interference, etc. as well as application type including data, voice, or a combination thereof.

In a first aspect of the mechanism, the UE 115 may identify the traffic types. The UE 115 may perform this identification in a variety of ways. In a first example, the UE 115 may determine the IMS stack status which may be obtained at a baseband through an interface between the application processor and the baseband processor of the UE 115. In a second example, the UE 115 may determine the traffic type based upon Quality of Service (QoS) Class Identifier (QCI) formats such as QCI1 for IMS voice, QCI5 for IMS signaling, etc. In a third example, the UE 115 may determine the C-DRX configuration such as 20 ms or 40 ms which may be indicative of VoLTE. In a fourth example, the UE 115 may identify a simultaneous operation where voice and data traffic are being used in a combination. It is noted that the above noted examples of the UE 115 determining the traffic types is only exemplary and there may be various other manners to perform this functionality including receiving an indication from a determination performed remotely, outside the UE 115.

As described above, the exemplary embodiments may utilize a dynamic BLER target for the channel state feedback operation. Accordingly, with the first aspect, the identification of the traffic type may be one basis upon which to determine the BLER target to be used. In a first example, when the UE 115 determines the use of data traffic only, a first BLER target may be set. Specifically, a BLER target Td may be set for data traffic where Td may be approximately 10%. As noted above, the BLER target may be more relaxed with data traffic which enables a more generous BLER target. In a second example, when the UE 115 determines the use of voice traffic only, a second BLER target may be set.

Specifically, a BLER target Tv may be set for voice traffic where Tv may be approximately 1%. As noted above, the nature of voice traffic may require more stringent connection parameters which therefore utilizes a smaller opportunity to experience errors. In a third example, when the UE 115 determines the use of a combination of voice and data traffic, a third BLER target may be set. Specifically, a BLER target Tdv may be set for combination traffic where Tdv may be an intermediate value between Tv and Td. It is noted that the UE 115 may also determine an objective of the application utilizing the combination traffic. For example, if the application has a voice-prioritized optimization objective, the BLER target of Tv may be set due to the objective. However, if the application has a voice and data balanced optimization objective, the BLER target Tdv may be set due to this balance. Through this selection of the BLER target, the UE 115 may provide information to the eNB 110 through a resulting CQI value that is determined from this dynamically set BLER target. Accordingly, the eNB 110 may manage the connection using this information where a first traffic type such as voice may be given a more robust connection (e.g., higher reliability but possibly lower speed) and a second traffic type such as data may be given a less robustness (e.g., lower reliability but higher speed).

In a second aspect of the mechanism, the UE 115 may identify the link scenarios. The UE 115 may perform this identification in a variety of ways such as from the connection-related information. In a first example, the UE 115 may determine a Doppler estimation based upon cell-specific reference signals (CRS). Those skilled in the art will understand that a Doppler shift during wireless communications may result in negative consequences to the connection where a any amount of Doppler shift may have these negative consequences and a high amount of Doppler shift may have a higher degree of these negative consequences. In a second example, the UE 115 may determine a SNR estimation based upon CRS for transmission modes (TM) 1-6, based upon UE-reference symbol (RS) for TM 7-9, etc. Those skilled in the art will understand that the SNR estimation may provide a signal quality assessment where a higher SNR estimation is indicative of a better signal quality. In a third example, the UE 115 may determine a mobility parameter such as based upon reference signal received power (RSRP) changing patterns, a strength of neighbor cells, etc. Those skilled in the art will understand that the mobility of the UE 115 may affect the connection as a moving UE 115 may create alterations to the signal quality whereas a UE 115 that is not moving may continue to utilize an established connection. In a fourth example, the UE 115 may determine interference levels such as an estimation being based upon an estimation of colliding and/or non-colliding CRS from neighbor cells, based upon network assisted interference cancellation and suppression (NAICS) signaling, based upon applied receiver interference mitigation or cancellation algorithms, etc.

As described above, the exemplary embodiments may utilize a dynamic BLER target for the channel state feedback operation. Accordingly, with the second aspect, the identification of the link scenarios may be another basis upon which to determine the BLER target to be used. Accordingly, the UE 115 may define adverse scenarios such as high Doppler, low SNR, high mobility, high interference level, etc. Through identification of the link scenarios, the UE 115 may set a BLER target of Te based upon the identification. The BLER target of Te may be based upon one or more of the link scenarios. For example, if any of the adverse scenarios are determined, the BLER target Te may be set to a first value whereas setting to a second value in the absence of all adverse scenarios. In a second example, the BLER target Te may be set to a plurality of different values based upon any permutation of existences of the adverse scenarios. In this manner, an even further dynamic utilization of the BLER target value may be provided, particularly in determining the CQI.

It should be noted that the first and second aspects may be used alone or combined with each other. When used alone, the UE 115 may determine whether the information to make the respective determinations is available. The UE 115 may then determine which of the aspects to set the BLER target. The UE 115 may also be predetermined to utilize one aspect over another aspect. When used in combination, a combined BLER target may be set. For example, the BLER target for the first aspect may be determined first such that the BLER target Te may affect the manner in which the combined BLER target may be set based upon whether the BLER target Td, Tv, or Tdv is being used. Specifically, the BLER target Te may be converted into a multiplier that may further narrow the BLER target of the first aspect such that the combined BLER target value may be less than the BLER target Td, Tv, or Tdv (based upon whichever is determined). For example, the BLER target Tv may be 1%. The BLER target Te may be determined based upon one or more adverse scenarios. Thus, the combined BLER target may be a value less than 1%. In another example, the BLER target Td may be 10%. The BLER target Te may be determined based upon no adverse scenarios which results in an identity multiplier. Thus, the combined BLER target may remain 10%. It is also noted that if information is not available for use in the first and second aspects, the UE 115 may select a default BLER target such as BLER target of Td.

It is noted that the channel state feedback report, particularly the CQI value, may have a dependency upon the dynamically set BLER target. That is, a BLER target based upon traffic type and/or link scenarios may constructively cause a calculation for the CQI value to be adjusted accordingly. Therefore, by setting a low BLER target such as 1%, this may set a minimum limit to be achieved through the connection of the UE 115 to the LTE-RAN 105. With this low BLER target, the calculation of the CQI value may be affected from using a different BLER target such as 10% such as lowering the CQI value. Specifically, the low BLER target may affect a channel estimation that is subsequently used in a mapping to determine the CQI value. By setting a higher BLER target such as 10%, the minimum limit to be achieved is raised which may inflate the CQI value that is calculated and increasing the CQI value. In this manner, the channel state feedback report may include information that is directly (or indirectly) affected by the dynamically set BLER target, thereby creating a dependency therebetween.

Figure 5:
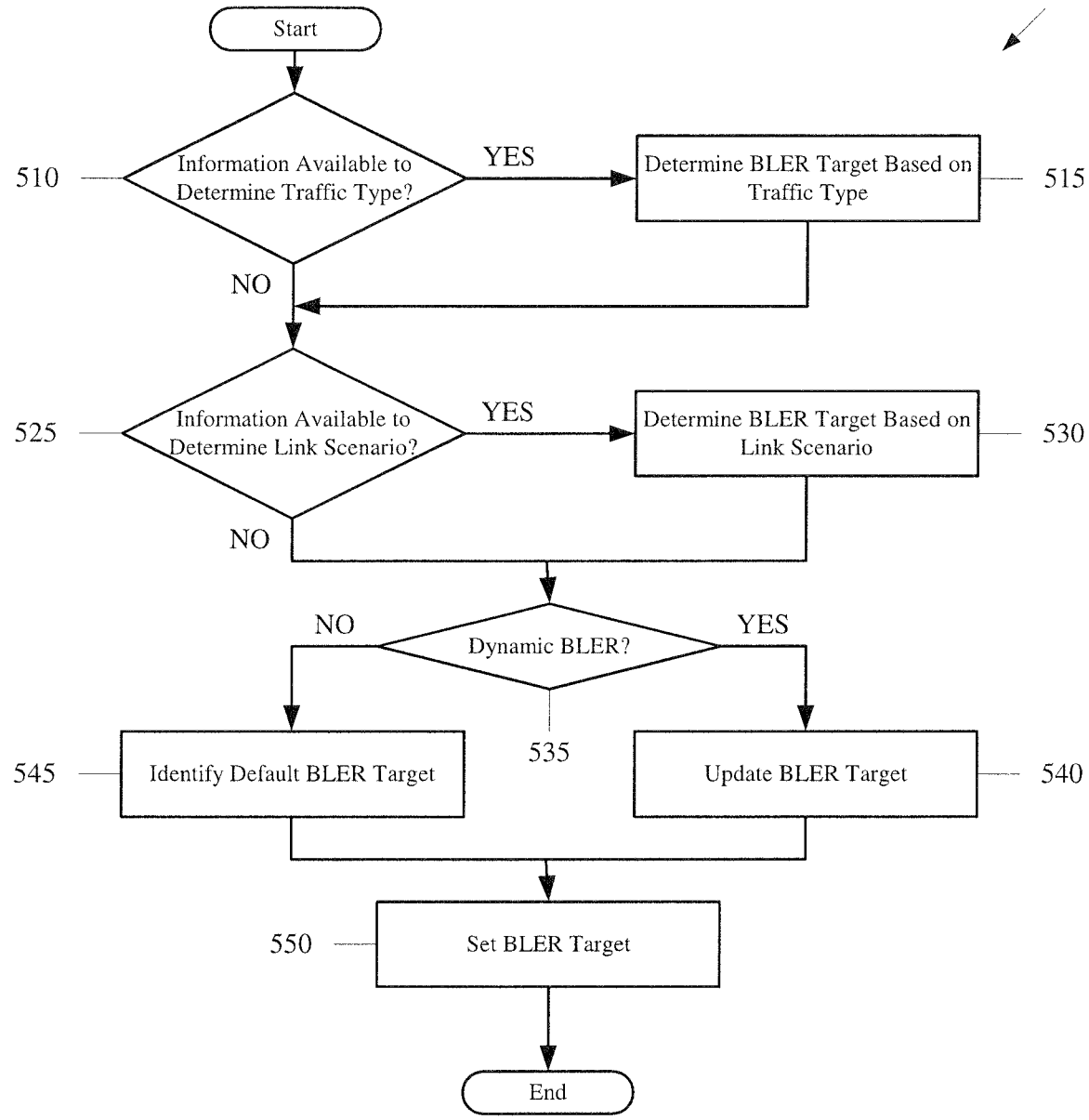
FIG. 5 shows an exemplary method for determining a parameter for a channel state feedback operation according to the exemplary embodiments.

FIG. 5 shows an exemplary method 500 for determining a parameter for a channel state feedback operation according to the exemplary embodiments. Specifically, the parameter determined in the method 500 may be the BLER target value to be used in the channel state feedback operation. As discussed above, the exemplary embodiments may provide a mechanism performed by the UE 115 by which the BLER target value may be dynamically set in performing the channel state feedback operation. The method 500 will be described with regard to the network arrangement 100 of FIG. 1, the UE 115 of FIG. 2, the eNB 110 of FIG. 3, and the link adaptation loops 400 of FIG. 4.

In step 510, the UE 115 determines whether there is information to determine the traffic types. Although the sources of the information to determine the different traffic types may be readily available and/or stored in some format in the memory 210, those skilled in the art will understand that the information may be inaccessible for some reason. If unavailable, the UE 115 continues the method 500 to step 520. However, if the information such as application types with associated traffic usage is available, the UE 115 continues the method 500 to step 515.

In step 515, the UE 115 determines the BLER target value to be used in view of the available information. Initially, the UE 115 determines the types of traffic currently utilizing the connection to the LTE-RAN 105 via the eNB 110. As described above, the UE 115 may determine whether applications are utilizing data only, voice only, or a combination of data and voice where a priority may be given to voice or to a balance. Also described above, the UE 115 may determine the traffic types using a variety of different information sources such as IMS, QCI, CDRX, etc. Based upon the determine traffic types, the BLER target value may be determined and may range from Td to Tv, where Td (e.g., 10%) may represent the BLER target value when using data traffic only, Tv (e.g., 1%) may represent the BLER target value when using voice traffic only or a simultaneous voice/data having a voice priority, and Tdv (e.g., 5%) may represent the BLER target value when using a simultaneous voice/data having a balance priority. It should be noted that the BLER target Td may be an upper limit in selecting the BLER target for the channel state feedback operation. That is, the BLER target may not exceed this value. However, this is only exemplary and exceptions may be made in this evaluation. It should also be noted that the BLER target Td and Tv being used as the bounds of the BLER target determination based upon traffic types is only exemplary. The applications may also utilize further types of traffic that utilize other BLER target values which may be greater than or less than either Td or Tv.

In step 525, the UE 115 determines whether there is information to determine the link scenarios. In a substantially similar manner as the traffic types, although the sources of the information to determine the link scenarios may be readily available and/or stored in some format in the memory 210, those skilled in the art will understand that the information may be inaccessible for some reason. If unavailable, the UE 115 continues the method 500 to step 535. However, if the information such as connection-related information including channel estimation, signal power, etc. is available, the UE 115 continues the method 500 to step 530.

In step 530, the UE 115 determines the BLER target value to be used in view of the available information. Initially, the UE 115 determines the link scenarios regarding the connection parameters and metrics being experienced by the UE 115 in utilizing the connection to the LTE-RAN 105 via the eNB 110. As described above, the UE 115 may determine whether conditions exist at the UE 115 regarding its network connection, particularly adverse scenarios. Also described above, the UE 115 may determine the link scenarios based upon a variety of different metrics such as Doppler, SNR, mobility, interference, etc. Based upon the determined link scenarios, the BLER target Te may be determined and may also range from Td to Tv, where Te represents the BLER target value using only the link scenario information. In a first example, the BLER target Te may be a first value such as Te1 that is greater than or equal to Tv when no adverse scenarios are determined and optimal conditions are determined. In a second example, the BLER target Te may be a second value such as Tet that is less than or equal to Td and greater than Te1 when adverse conditions are determined. In a third example, the BLER target Te may be one of a plurality of values based upon the different scenarios and conditions as well as a scalar component of the conditions (e.g., high Doppler versus intermediary Doppler versus low Doppler; low SNR versus high SNR; etc.).

In step 535, the UE 115 determines whether a dynamic BLER is to be used. If the UE 115 determined that at least one information of the traffic types, link scenarios, or both, the UE 115 continues the method 500 to step 540. In step 540, the UE 115 updates the BLER target value using the dynamic value. For example, when only the traffic type information is available, the UE 115 may utilize the BLER target value determined in step 515. In another example, when only the link scenario information is available, the UE 115 may utilize the BLER target value determined in step 530. In a further example, when both the traffic type and link scenario information is available, the UE 115 may combine the determined BLER values (e.g., converting the link scenario BLER target into a multiplier for the traffic type BLER target) to determine a combined BLER target value. If the UE 115 determined in step 510 that the information for the traffic types is unavailable and determined in step 525 that the information for the link scenarios is unavailable, the UE 115 continues the method 500 to step 545. In step 545, the UE 115 identifies the default BLER target value to be used. For example, the default BLER target value may be the upper limit such as Td (e.g., 10%). Thus, in step 550, the UE 115 sets the BLER target value for use in the channel state feedback operation.

The channel state feedback operation may be an operation used in the link adaptation operation to generate a report of an estimation determined therefrom. Specifically, the information saved from pilot signals may be used in the channel state feedback operation. The channel state feedback report generated from this operation may include three components: a CQI, a PMI, and a RI. The CQI may be based on an unrestricted observation interval in time and frequency where the UE 115 derives for each CQI value reported in an uplink subframe n a highest CQI index between 1 and 15 from a predetermined CQI table that satisfies a condition. The condition may be whether a single PDSCH transport block with a combination of modulation scheme and transport block size corresponding to the CQI index and occupying a group of downlink physical resource blocks termed the CQI reference resource may be received with a transport block error probability not exceeding 0.1. The PMI may be used by the UE 115 to feedback to the eNB 105 for a selection of a precoding matrix to optimize the throughput. The UE 115 may usually determine the PMI based on a channel estimation and calculate an expected throughput with available hypotheses of precoding matrices. The RI may be an indicator that signals the eNB 105 of a number of transmission layers the UE 115 is capable of supporting to maximize throughput.

In LTE systems, the MCS may be defined to enable different levels of coding rates and modulation orders as may be defined in a predetermined transport block size (TBS) table for the downlink PDSCH. The predetermined TBS table may be used in transport block size tables as defined in the CQI table. Therefore, according to the exemplary embodiments, based on a description of the CQI for the LTE, from the perspective of the UE 115, the BLER target value that is set using the method 500 may be a minimum standard for any CQI given the downlink configuration defined in the CQI table. A scheduling algorithm in the eNB 105 may be described according to the requirement of the UE 115 to optimize the throughput. It is noted that the BLER target value may also be varied using the CQI value that is determined whereas multiple hypotheses of the precoding matrices and rank selection may be tried by the UE 115 to determine the optimal PMI and RI.

The process of determining the CQI may utilize the connection-related information such as channel estimation and noise estimation. That is, a whitened channel estimation matrix may be determined for the CQI calculation. To get the CQI estimation, an effective SNR estimation may be performed based on the whitened channel matrix and receiver algorithm. There may be several types of receiver modulation algorithms including linear minimum mean square error (LMMSE), maximum likelihood method (MLM), LMMSE with a serial interference cancellation (SIC) (LMMSE-SIC), etc. The estimated SNR value may subsequently be mapped to an estimated SE metric considering a channel capacity and possible loss due to practical receivers. It is noted that the SE estimation may be done in a finer granularity on a smaller number of RBs (e.g., 2 RBs). The sub-band SE may be averaged across the wideband and filtered over time to have a wideband (WB) estimation of the SE. The SE estimation may then be mapped to a certain CQI value to be reported back to the eNB 105.

The filtering of the SE may be of importance in the CQI/PMI/RI reporting in the channel state feedback operation as the reporting may reflect how fast the UE 115 may respond to the channel or related spectral efficiency changes. The filtering mechanisms may include IIR or finite impulse response (FIR). FIR filtering may have a fixed length of memory and is a weighted sum of a previous SE estimation. IIR filtering may have a memory of infinite length with an impact of each sample exponentially decreasing which provides a smooth weighted average across the time. A simple IIR filter may be a single pole IIR filter and the time constant may be approximated as an inverse of the IIR filter coefficient.

Furthermore, the CQI report requested by the eNB 105 may include WB or M-subband report. The WB report may require the UE 115 to report an averaged WB estimation of CQI. The M-subband CQI report mode may specify the UE 115 to report the subband CQIs on M different subbands with a defined number of RBs (e.g., each RB may contain 12 tones in an LTE context with 180 kHz bandwidth). To respond to different CQI report modes, the SE averaging or filtering may also need to be performed in frequency domain accordingly.

In addition, in a dynamic propagation environment, Doppler estimation may be used to estimate the Doppler spread encountered by the UE 115 as it moves with non-zero speed. The Doppler spread may be directly proportional to the channel time correlation. That is, the faster the UE 115 moves, the larger the Doppler spread that is encountered and smaller channel correlation time. The information about how long a channel stays correlated may affect proper filtering and processing of channel and noise estimation. Thus, this may have a direct impact on downlink demodulation of traffic and control channels.

There may be various ways of estimating the Doppler spread. In a first example, assuming that the channel time auto-correlation has a direct relationship with the Doppler spread rather than directly estimating the Doppler spread, the channel time auto-correlation estimate may be used to perform the Doppler spread classification into various Doppler spread regimes. In a second example, a maximum likelihood estimation based on the Doppler power spectral density may be performed. That is, the Doppler power spectral density (PSD) of a fading channel may describe how much spectral broadening it causes. The UE 115 may estimate its own PSD using the channel estimation obtained from the pilot signals and estimate the Doppler shift based on a maximum likelihood estimation of the expected Doppler PSD.

Using the above mechanisms, the UE 115 may perform the inner loop functionality of the link adaptation feedback operation. Accordingly, the UE 115 may receive the pilot signals to perform the various operations associated with the inner loop including the inner scheduling 410. Further considerations such as the Doppler spread may also be incorporated into the inner loop functionality. Thus, the UE 115 may generate a channel state feedback estimation report to be provided back to the eNB 110 via the inner report 420. This process may continue for the eNB 110 to manage the connection between the UE 115 and the LTE-RAN 105. However, throughout this entire process, the BLER target value is a fundamental parameter that is to be observed in the calculations, particularly the CQI. In this manner, the dynamically set BLER target according to the exemplary embodiments may refine the inner loop functionality.

Figure 6:
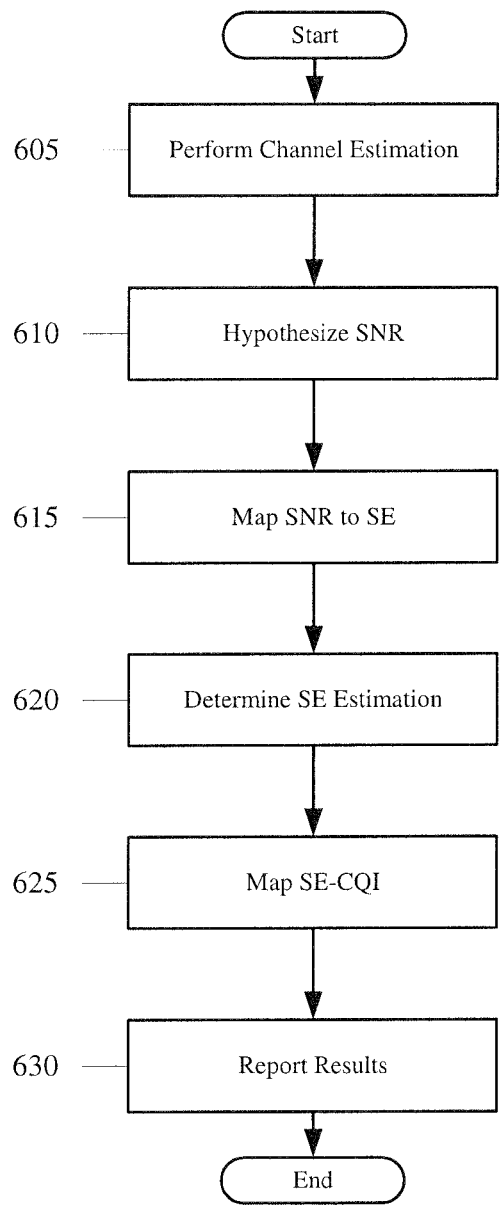
FIG. 6 shows an exemplary method for a channel state feedback operation according to the exemplary embodiments.

FIG. 6 shows an exemplary method 600 for a channel state feedback operation according to the exemplary embodiments. Specifically, the method 600 performs the steps in generating a report for the channel state feedback operation. Accordingly, this may relate to a functionality performed by the UE 115. The steps in which the channel state feedback operation are performed may be based upon the BLER target value determined in the method 500. The method 600 will be described with regard to the network arrangement 100 of FIG. 1, the UE 115 of FIG. 2, the eNB 110 of FIG. 3, and the link adaptation loops 400 of FIG. 4.

In step 605, the UE 115 performs a channel estimation on a received transmission such as the pilot signals. In step 610, an effective SNR estimation is performed per PMI and/or RI hypothesis. It is noted that other SNR calculations may be used in this step. However, the BLER target value may be observed in these calculations. Specifically, the BLER target value as was set using the method 500 may be used in these calculations. In step 615, the SNR may be mapped to the SE such as based upon the predetermined CQI table and/or the predetermined TBS table. In step 620, the SE estimation may be determined through filtering with a hypothesized optimal PMI and/or RI selection. In step 625, the SE estimation may be mapped to a CQI via the table. In step 630, the channel state feedback estimation report may be generated and reported back to the eNB 105.

It is noted that the channel state feedback report may be utilized by the eNB 110 in a variety of ways. As described above, the information included in the channel state feedback report may define how the eNB 110 manages the connection between the UE 115 and the LTE-RAN 105. Thus, when the channel state feedback report includes a very high CQI value (e.g., 30), the eNB 110 may determine that the connection between the UE 115 and the LTE-RAN 105 is ideal. However, when the channel state feedback report includes a very low CQI value (e.g., >1), the eNB 110 may determine that the connection between the UE 115 and the LTE-RAN 105 may require adjustment such as a power level, higher robustness, lower speed, etc.

The exemplary embodiments provide a device and method of determining a BLER target value to be used in an inner loop functionality of a channel state feedback operation utilized with a link adaptation operation for a UE connected to a LTE-RAN. The BLER target value may be dynamically selected based upon a variety of factors such as traffic types being used, link scenarios being experienced, and a combination thereof. Through a different selection of the BLER target value in calculations of the channel state feedback operation such as a CQI estimation, the information provided in a channel state feedback estimation report to the LTE-RAN may more accurate in subsequent channel monitoring processes.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment (UE) connected to a Long Term Evolution (LTE) network via an evolved Node B (eNB):
   determining a type of wireless traffic being utilized by the UE based upon at least one application executed on the UE, the wireless traffic being one of a data only, a voice only, or a combination thereof; and
   determining a block error rate (BLER) target value to be used in a channel state feedback operation to be performed by the UE, the channel state feedback operation associated with a link adaptation operation for a connection between the UE and the eNB.

2. The method of claim 1, wherein the BLER target value is related to the type of wireless traffic being utilized by the UE, wherein the BLER target value for a data only wireless traffic is a first BLER value, wherein the BLER target value for a voice only wireless traffic is a second BLER value, and wherein the BLER target value for the combination wireless traffic is a third BLER value.

3. The method of claim 2, wherein the second BLER value is greater than the third BLER value, which is greater than the first BLER value.

4. The method of claim 2, wherein the combination wireless traffic has one of a priority to a voice portion and a balance between the voice portion and a data portion.

5. The method of claim 4, wherein the third BLER value is equal to the second BLER value when the priority is to the voice portion, wherein the third BLER value is between the first and second BLER values when the priority is to the balance.

6. The method of claim 1, further comprising:
   determining a type of link scenario present at the UE based upon connection-related information ;
   determining a further BLER target value based upon the type of link scenario; and
   determining an updated block error rate (BLER) target value to be used in the channel state feedback operation.

7. The method of claim 6, wherein the link scenario is at least one of a Doppler estimation, a signal to noise ratio (SNR) estimation, a mobility, an interference level, or a combination thereof.

8. The method of claim 6, wherein the connection-related information is indicative of at least one of a channel estimation, a cell-specific reference signal (CRS), a reference signal received power (RSRP), a collision of CRS from neighboring eNBs, or a network assisted interference cancellation and suppression (NAICS) signaling.

9. The method of claim 1, further comprising:
   determining connection-related information based upon at least one signal received from the eNB;
   performing the channel state feedback operation using the connection-related information,
   wherein the channel state feedback operation includes a channel estimation, a hypothesizing of a SNR, a first mapping of the SNR to a spectral efficiency (SE), a SE estimation, and a second mapping of the SE to a channel quality indicator (CQI).

10. The method of claim 1, wherein the BLER target is a parameter used in determining a CQI, the CQI being used in the channel state feedback operation.

11. A user equipment, comprising:
    a transceiver establishing a connection with an evolved Node B (eNB) of a Long Term Evolution (LTE) network; and
    a processor determining a type of wireless traffic being utilized by the UE based upon at least one application executed on the UE, the wireless traffic being one of a data only, a voice only, or a combination thereof, the processor determining a block error rate (BLER) target value to be used in a channel state feedback operation to be performed by the UE, the channel state feedback operation associated with a link adaptation operation for a connection between the UE and the eNB.

12. The user equipment of claim 11, wherein the BLER target value is related to the type of wireless traffic being utilized by the UE, wherein the BLER target value for a data only wireless traffic is a first BLER value, wherein the BLER target value for a voice only wireless traffic is a second BLER value, and wherein the BLER target value for the combination wireless traffic is a third BLER value.

13. The user equipment of claim 12, wherein the second BLER value is greater than the third BLER value, which is greater than the first BLER value.

14. The user equipment of claim 12, wherein the combination wireless traffic has one of a priority to a voice portion and a balance between the voice portion and a data portion.

15. The user equipment of claim 14, wherein the third BLER value is equal to the second BLER value when the priority is to the voice portion, wherein the third BLER value is between the first and second BLER values when the priority is to the balance.

16. The user equipment of claim 11, wherein the processor determines a type of link scenario present at the UE based upon connection-related information, determines a further BLER target value based upon the type of link scenario, and determines an updated block error rate (BLER) target value to be used in the channel state feedback operation.

17. The user equipment of claim 16, wherein the link scenario is at least one of a Doppler estimation, a signal to noise ratio (SNR) estimation, a mobility, an interference level, or a combination thereof.

18. The user equipment of claim 16, wherein the connection-related information from the eNB is indicative of at least one of a channel estimation, a cell-specific reference signal (CRS), a reference signal received power (RSRP), a collision of CRS from neighboring eNBs, or a network assisted interference cancellation and suppression (NAICS) signaling.

19. The user equipment of claim 11, wherein the processor determines connection-related information based upon at least one signal received from the eNB, the processor performing the channel state feedback operation using the connection-related information, wherein the channel state feedback operation includes a channel estimation, a hypothesizing of a SNR, a first mapping of the SNR to a spectral efficiency (SE), a SE estimation, and a second mapping of the SE to a channel quality indicator (CQI).

20. A method, comprising:
   at a user equipment (UE) connected to a Long Term Evolution (LTE) network via an evolved Node B (eNB):
      determining at least one of a type of wireless traffic being utilized by the UE and a link scenario present at the UE based upon at least one application executed on the UE and connection-related information;
      setting a block error rate (BLER) target value based upon the at least one of the type of wireless traffic and the link scenario;
      determining channel state information based upon the BLER target value; and
      generating a channel state feedback report to be transmitted to the eNB, the channel state feedback report including the channel state information.

21. The method of claim 20, wherein the channel state information includes a channel quality indicator (CQI).

* * * * *